(No Model.)
J. F. PRAY.
SULKY.
No. 491,591. Patented Feb. 14, 1893.
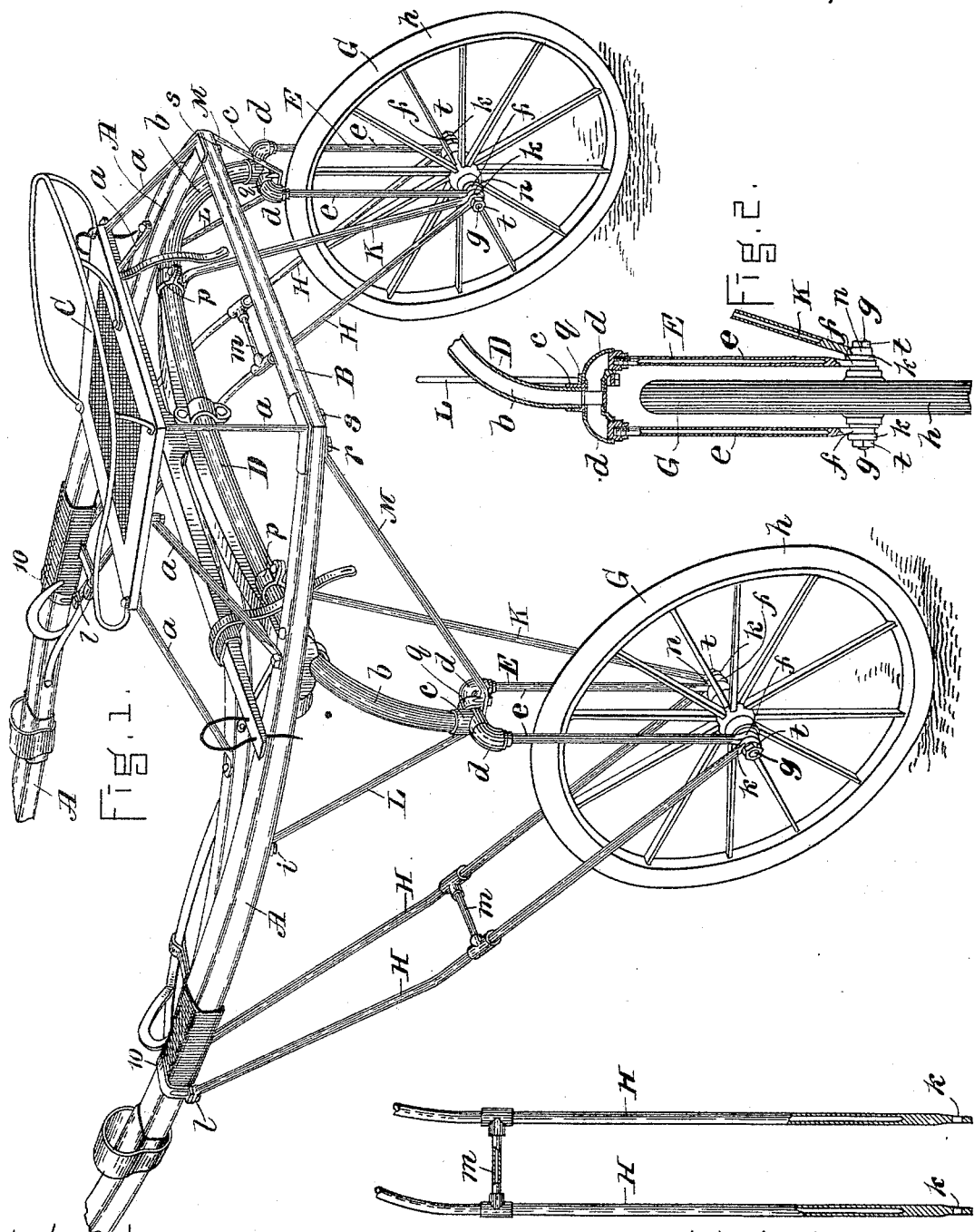
Witnesses.
R. Henry Marsh.
Harry W. Aiken.
Inventor.
Joseph F. Pray
by J. E. Teschemacher
Atty.
THE NORRIS PETERS CO., PHOTO-LITHO., WASHINGTON, D. C.

UNITED STATES PATENT OFFICE.

JOSEPH F. PRAY, OF BOSTON, MASSACHUSETTS.

SULKY.

SPECIFICATION forming part of Letters Patent No. 491,591, dated February 14, 1893.

Application filed August 12, 1892. Serial No. 442,899. (No model.)

*To all whom it may concern:*

Be it known that I, JOSEPH F. PRAY, a citizen of the United States, residing at Boston, in the county of Suffolk and State of Massachusetts, have invented certain Improvements in Sulkies, of which the following is a full, clear, and exact description, reference being had to the accompanying drawings, making part of this specification, in which—

Figure 1 is a perspective view of a sulky constructed in accordance with my invention. Fig. 2 is a vertical section through one end of the tubular axle and the wheel hanger. Fig. 3 is a sectional detail to be referred to.

My invention relates to that description of sulkies which are provided with wheels having pneumatic tires and known as "bicycle wheels," and has for its object to increase the strength and rigidity of the vehicle and at the same time reduce the weight to a minimum; and to this end my invention consists in the peculiar construction and combinations of parts as hereinafter more fully described and specifically set forth in the claims.

In the said drawings, A, A, represent the shafts or thills of a sulky, B the back-bar, and C the seat, the latter supported as usual by means of rods or braces $a$, secured to the shafts.

D is a hollow or tubular axle, preferably composed of gas pipe, and having its end portions $b\ b$ curved or bent downward, the main portion between said portions $b\ b$, being arched or curved upward as shown. The shafts are secured to the axle D by means of clips and bolts or other suitable fastenings.

To each of the downwardly turned ends $b\ b$ of the axle is secured a bifurcated tubular wheel-hanger E composed of a T-coupling $c$ which is screwed over the end $b$, two elbows $d, d,$ and two depending tubular portions $e, e,$ all screwed together as shown in Fig. 2. The lower end of each of the portions $e, e,$ is made solid by inserting a suitably shaped piece of metal and welding it thereto, after which an eye $f$ is formed for the reception of the end of the wheel-spindle $g$ upon which runs a bicycle wheel G having a pneumatic tire $h$, said wheel being thus supported by and revolving between the forks $e, e,$ of the hanger as shown in Figs. 1 and 2. The wheel-spindle $g$ is provided as usual in bicycle wheels with ball bearings, not shown.

H, H, Figs. 1 and 3, are tubular braces preferably composed of gas pipe and extending from opposite sides of the bottom of each hanger E to the shaft A, each of said braces having solid welded ends provided with eyes $k, l,$ the former fitting over the end of the wheel-spindle $g,$ and the latter affording means for securing the brace to the shaft A by means of a suitable clip 10. These braces H, H, are strengthened and kept at the proper distance apart by a transverse tubular tie-piece $m$ extending from one to the other as shown in Figs. 1 and 3.

K is another tubular brace which extends from the bottom of the hanger E on the inner side to the hollow axle D, said brace K having solid welded ends, the lower end being provided with an eye $n$ adapted to fit over the end of the wheel-spindle $g$ and the upper end being secured to the axle by means of a clip $p$.

To the upper part $c$ of each of the tubular hangers E are secured by means of a suitable clip $q$ two braces L, M, the former, L, extending to the shaft A in front of the axle D where it is secured at $i$, and the latter, M, to the same shaft behind the axle, where it is secured to the said shaft and the back bar B by bolts $r, s.$ The ends of the braces which fit over the ends of the wheel-spindle $g$ are secured in place by nuts $t$ screwed over the ends of said spindle; and if preferred the contiguous ends of the braces H, K, may be welded together and provided with a single eye instead of each being provided with a separate eye as shown. With a hollow axle, constructed as described, the ordinary wooden axle-bed is dispensed with, thus simplifying the construction and still further reducing the weight, while the downwardly curved end portions of the axle enable the hangers to be secured thereto in an exceedingly simple and effective manner.

By constructing a sulky as above described, I am enabled to reduce the weight to a minimum and at the same time insure great strength and rigidity, thus enabling the vehicle to successfully withstand the severe strains and wear and tear to which it is liable to be subjected.

What I claim as my invention and desire to secure by Letters Patent is:—

1. In a sulky, a tubular axle having its ends curved or bent downward as shown, in combination with bifurcated tubular wheel hangers secured to the downwardly bent ends of the axle, and having solid welded ends provided with eyes for the reception of the wheel-spindles, and the tubular braces H, K, extending from the bottoms of the tubular wheel-hangers respectively to the shafts and axle, said braces having solid ends provided with means for attachment to the wheel-spindles, shafts, and axle, substantially as set forth.

2. In a sulky, a tubular axle having its ends curved or bent downward as shown, in combination with the bifurcated tubular wheel-hangers E, E, secured to the downwardly bent ends of the axle and having solid welded ends provided with eyes for the reception of the wheel-spindles, the tubular braces H, K, extending from the bottoms of the tubular wheel-hangers respectively to the shafts and axle, said braces having solid welded ends provided with means for attachment to the wheel-spindles, shafts, and axle, and the braces L, M, extending from the tops of the tubular hangers to the shafts substantially as set forth.

Witness my hand this 10th day of August, A. D. 1892.

JOSEPH F. PRAY.

In presence of—
P. E. TESCHEMACHER,
HERBERT B. LORD.